United States Patent [19]

Tokas

[11] 4,221,878
[45] Sep. 9, 1980

[54] MYRCENE AS AN ACRYLONITRILE SCAVENGER

[75] Inventor: Edward F. Tokas, West Hatfield, Mass.

[73] Assignee: Monsanto Company, St. Louis, Mo.

[21] Appl. No.: 943,565

[22] Filed: Sep. 18, 1978

[51] Int. Cl.$^2$ ............................................. C08F 6/00
[52] U.S. Cl. ...................................... 525/1; 215/1 C; 260/32.4; 260/45.9 KA; 264/211; 264/500; 426/106; 525/313; 528/498; 264/328.6
[58] Field of Search ............... 528/498; 260/45.9 KA, 260/32.4, 881; 264/88, 211, 329, 500; 426/106; 525/313; 215/1 C; 526/1

[56] References Cited

U.S. PATENT DOCUMENTS

| | | | |
|---|---|---|---|
| 2,382,803 | 8/1945 | Miller et al. | 260/464 |
| 3,172,879 | 3/1965 | Ferstandig et al. | 260/88.7 |
| 3,635,883 | 1/1972 | Stamid | 260/45.75 K |
| 3,863,014 | 1/1975 | Mottus | 526/332 |
| 3,870,802 | 3/1975 | Harris et al. | 426/106 |
| 3,900,120 | 8/1975 | Sincock | 215/1 C |
| 3,931,074 | 1/1976 | Gomez | 260/23 R |
| 3,974,297 | 8/1976 | Ott | 426/106 |
| 3,998,796 | 12/1976 | Brandli et al. | 526/40 |
| 4,052,348 | 10/1977 | Harris et al. | 260/5 |

*Primary Examiner*—Stanford M. Levin
*Attorney, Agent, or Firm*—Michael J. Murphy

[57] ABSTRACT

A process of reducing free acrylonitrile monomer in nitrile polymers during conversion to melt form which involves having an effective amount of an acrylonitrile scavenger such as myrcene in admixture with the polymer during melting. Shaped products such as preforms, containers, film, sheet, etc., formed from such melt are well suited for packaging food, beverages, pharmaceuticals, cosmetics, etc., in that residual acrylonitrile monomer in the walls of such products is minimal.

42 Claims, No Drawings

MYRCENE AS AN ACRYLONITRILE SCAVENGER

CROSS REFERENCE TO RELATED APPLICATIONS

1. "Chemically Reducing Residual Styrene Monomer In Styrenic Polymers And Shaped Products Formed Therefrom," Edward F. Tokas, U.S. Ser. No. 951,503, Filed Oct. 16, 1978.

2. "Molding Compositions And Processes For Preparing Same," Edward F. Tokas, U.S. Ser. No. 951,493, Filed Oct. 16, 1978.

BACKGROUND OF THE INVENTION

This invention relates to a process for chemically reducing acrylonitrile (AN) monomer in nitrile polymers and more particularly to packaging materials shaped from the melted polymer wherein free AN monomer therein is minimal.

Thermoplastic nitrile polymer compositions containing polymerized AN can be usefully shaped into a wide variety of useful articles by conventional techniques such as extrusion, milling, molding, drawing, blowing, etc. Applications for such shaped articles are widespread and include structural units where properties such as stiffness, impact resistance, dimensional stability, high gloss and toughness are required, for example pipe, bars, appliance housings, car parts, refrigerator liners and the like, replacements for glass for weight reduction as for automotive lenses, layer(s) in laminated windshields, security panels and/or other multi-layer structural laminates. When the polymerized AN level is at least about 50 weight percent, the compositions uniquely exhibit excellent solvent resistance and low permeability to liquids and gases which make them especially useful as a lightweight substitute for glass in packaging and particularly in the manufacture of bottles, film, sheet, tubs, cups, trays and other containers for liquids and solids.

In manufacturing nitrile polymer compositions, it is well known and has been tolerated that trace levels of free, unconverted, AN monomer remain absorbed within the polymer particles when polymerization is not 100% complete and which is therefore present in products formed therefrom. Recently, however, certain government regulatory agencies are moving toward establishing maximum permissible levels of AN monomer in the environment on grounds that excess AN levels in the atmosphere generated during handling and working of these resins may constitute a health hazard in view of the toxicity of AN monomer, and particularly have regulations been applied to packaging materials intended for contact with environmentally sensitive products such as food, beverages, pharmaceuticals, cosmetics and the like for which application nitrile polymers are especially suited.

Efforts to reduce free, unreacted AN in nitrile polymers in response to such government pronouncements have involved steam stripping the polymer before melt processing, and when carried out for a sufficient time this can greatly reduce the residual monomer to miniscule levels. However, even with polymer initially having extremely low residual AN content, it was unexpectedly discovered that free AN monomer is thermally regenerated due to polymer unzipping up to levels on the order of 7 to 10 times the initial level during melting at standard melt processing times and temperatures. Such an increase caused an associated increase in extractable AN form shaped packaging materials in contact with food simulating solvents. Accordingly, reduction of AN monomer in the raw polymer proved unsuccessful in minimizing AN in shaped products formed in an operation involving melt processing.

SUMMARY OF THE INVENTION

Now, however, process improvements have been developed to minimize such prior art shortcomings.

Accordingly, a principal object of this invention is to provide process improvements to minimize generation of free AN monomer during conversion to melt form of a nitrile polymer composition containing polymerized acrylonitrile.

Another object is to provide a chemical scavenger for or regulator of AN monomer which is effective at miniscule levels of AN monomer to minimize generation of the latter during melt processing of polymerized-acrylonitrile-containing nitrile polymers.

A further object is to provide such a scavenger which is compatible with the polymer at low concentrations to avoid the need to use excess amounts which could cause deterioration of properties in the shaped product, such as optical (e.g. color and haze) and taste properties which are important in packaging environmentally sensitive materials.

A particular object is to provide improved nitrile compositions in the form of shaped packaging materials wherein extractable AN monomer therein is below certain maximums.

Other objects of this invention will in part be obvious and will in part appear from the following description and claims.

These and other objects are accomplished in the process of melting a nitrile polymer by physical working while generating free AN monomer in the melt by providing the improvement which comprises having a scavenging amount of myrcene in admixture with the polymer during such converting to minimize the level of free AN monomer in the polymer.

From a preferred product standpoint, a shaped packaging material for environmentally sensitive products is provided which is formed of a thermoplastic resin comprising at least about 10 weight percent of polymerized AN monomer, the level of free AN monomer in such packaging material being no greater than about 7 parts per million (ppm) and preferably less than about 3 ppm based on the total weight of the polymer. Foods or selected substances such as beverages packaged in these materials extract less than about 10 parts per billion (<10 ppb) and preferably less than about 5 ppb residual AN monomer (RAN) using an extraction period of 7 days at 49° C. in accordance with test procedures hereinafter described.

PREFERRED EMBODIMENTS

Nitrile polymers useful in the present invention generate free AN monomer during melting, contain at least about 10% by weight of polymerized AN and one or more comonmers copolymerizable with the AN. Such comonomers include:

(a) the monovinylidene aromatic hydrocarbon monomers of the formula:

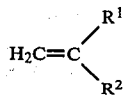

wherein $R^1$ is hydrogen, chlorine or methyl and $R^2$ is an aryl group of 6 to 10 carbon atoms and may also contain substituents such as halogen as well as alkyl groups attached to the aromatic nucleus, e.g., styrene, alpha methylstyrene, vinyl toluene, alpha chlorostyrene, ortho chlorostyrene, meta chlorostyrene, para chlorostyrene, ortho methylstyrene, para methylstyrene, ethyl styrene, isopropyl styrene, dichloro styrene, vinyl naphthalene, etc.

(b) lower alpha olefins of from 2 to 8 carbon atoms, e.g., ethylene, propylene, isobutylene, butene-1, pentene-1 and their halogen and aliphatic substituted derivatives, e.g., vinyl chloride, vinylidene chloride, etc.

(c) acrylic acid and methacrylic acid and the corresponding acrylate and methacrylate alkyl esters where the alkyl group contains from 1 to 4 carbon atoms, e.g., methyl acrylate, ethyl acrylate, propyl acrylate, methyl methacrylate, etc.

(d) vinyl esters of the formula:

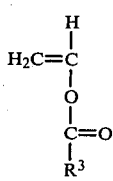

wherein $R^3$ is hydrogen, an alkyl group of from 1 to 10 carbon atoms, an aryl group of 6 to 10 carbon atoms, e.g., vinyl formate, vinyl acetate, vinyl propionate, vinyl benzoate, etc., (e) vinyl ether monomers of the formula:

$$H_2C=CH-O-R^4$$

wherein $R^4$ is an alkyl group of from 1 to 8 carbon atoms, an aryl group of from 6 to 10 carbon atoms or a monovalent aliphatic radical of from 2 to 10 carbon atoms, which aliphatic radical may be hydrocarbons or oxygen-containing, i.e., an aliphatic radical with ether linkages and may also contain other substituents such as halogen, carbonyl, etc. Examples of these monomeric vinyl ethers include vinyl methyl ether, vinyl ethyl ether, vinyl n-butyl ether, vinyl 2-chloroethyl ether, vinyl phenyl ether, vinyl cyclohexyl ether, 4-butyl cyclohexyl ether, and vinyl p-chlorophenylene glycol ether, etc.

(f) olefinically unsaturated mononitriles having the formula:

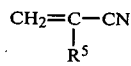

wherein $R^5$ is an alkyl group having 1 to 4 carbon atoms or a halogen. Such compounds include methacrylonitrile; ethacrylonitrile; propioacrylonitrile, alpha chloracrylonitrile, etc.

Additional comonomers useful in the practice of this invention are those comonomers which contain a mono- or di-nitrile function. Examples of these include methylene glutaronitrile, 2,4-dicyanobutene-1, vinylidene cyanide, crotonitrile, fumaronitrile, maleonitrile.

Preferred comonomers are the monovinylidene aromatic hydrocarbons, lower alpha olefins, acrylic and methacrylic acid and the corresponding acrylate and methacrylate esters, with the monovinylidene aromatic hydrocarbons being more particularly preferred. Most specifically preferred is styrene and alpha methylstyrene. Another preferred composition is a terpolymer of acrylonitrile, styrene and vinyl ether such as disclosed in U.S. Pat. No. 3,863,014.

The amount of comonomer as defined above present in the nitrile composition can vary up to about 90% by weight based on the total weight of the nitrile polymer composition. Preferred nitrile compositions for packaging applications requiring excellent oxygen and water vapor barrier properties in the packaging materials contain at least about 50%, e.g., from about 50 to 90% by weight of polymerized acrylonitrile monomer and from about 10 to about 50% by weight of comonomer and more preferably from about 55 to about 85% by weight of acrylonitrile monomer and from about 15 to about 45% by weight of comonomer, all based on total polymer weight.

Nitrile polymers within the scope of this invention may also contain an elastomer in the form of a synthetic or natural rubber component such as polybutadiene, isoprene, neoprene, nitrile rubbers, natural rubbers, acrylonitrilebutadiene copolymers, ethylene-propylene copolymers, chlorinated rubbers, etc., which are used to strengthen or toughen products such as shaped packaging materials. This rubber component may be incorporated into the nitrile polymer by any of the methods well known to those skilled in the art, e.g., direct polymerization of monomers, polyblends, grafting the acrylonitrile monomer mixture onto the rubbery backbone, etc. Especially preferred are polyblends derived by mixing a graft copolymer of acrylonitrile and comonomer on the rubbery backbone with another copolymer of acrylonitrile and the same comonomer. Generally, such rubber component may comprise from 0 to about 25% and preferably up to about 10% by weight of the nitrile polymer composition.

The active treating ingredient for reducing the free AN monomer content of the nitrile polymer is myrcene having the formula 3-methylene-7-methyl-1,6-octadiene. Myrcene is a terpene hydrocarbon which has U.S. Food and Drug Administration (FDA) approval as a food additive. It has the form of a colorless liquid at room temperature having a boiling point of 67° C. and a balsamic resinous odor. In place of pure natural myrcene which occurs as a constituent of bay oil and other essential oils, or pure synthetic myrcene it is possible to employ materials rich in myrcene. For example, the pyrolysis of beta pinene yields mixtures containing as much as 77 weight % myrcene in conjunction with minor quantities of limonene and other complex terpenes.

The amount of myrcene used in the present invention is calculated to reduce the free residual acrylonitrile monomer (RAN) in the nitrile polymer after melting to less than about 7 ppm and preferably to less than about 3 ppm, which reduced levels of RAN in the polymer in turn result in extractable AN monomer levels from shaped packaging materials of the polymer in contact with food, pharmaceuticals, margarine, butter or like substances of less than about 5 ppb. Such myrcene amount should be insufficient to impart any myrcene-originated taste to any such packaged substances. Allowance should also be made for vaporization of some of the admixed myrcene during melting of the nitrile polymer. In general the scavenging or regulating amount of myrcene required to achieve this reduction in residual and extractable AN content will be in the range of from about 0.005 to about 4.0% by weight based on the weight of the nitrile polymer. In most applications the amount of myrcene will be in the range of from about 0.01 to about 1.5% by weight. When using a compound which yields myrcene or else behaves as a myrcene donor, the amount of such myrcene compound is calculated so as to provide an amount of myrcene within the preceding ranges.

As stated, nitrile polymers having minimal free, residual acrylonitrile monomer therein after melting are prepared by a process which comprises having a scavenging amount of myrcene in intimate admixture with the nitrile polymer during its conversion from solid to melt form. The intimate mixture of myrcene and nitrile polymer may be obtained by combining the myrcene with the nitrile polymer after polymerization, as for example, by adding it to the nitrile polymer in the polymer recovery steps such as during coagulation, stripping, washing, drying, etc., or by steeping the polymer in the presence of the liquid myrcene compound. Another method is to dry blend the nitrile polymer and myrcene prior to the melting step used in shaping the polymer. In still another method the myrcene and nitrile polymer are dispersed in a liquid medium followed by evaporation of the liquid medium. In still another method, the myrcene is injected into the molten polymer during the melting operation. Other methods of forming the intimate mixture will become apparent to those skilled in the art upon reading the present specification.

In general, the preferred methods of admixing the nitrile polymer and myrcene are blending the nitrile polymer in dry form with the myrcene or steeping the polymer in a liquid, perferably a non-solvent for the polymer, containing the myrcene compound.

The forming operations used to prepare products within the scope of this invention such as the preferred polymeric packaging materials, e.g., film, sheet, tubs, trays, containers such as bottles, cans, jars, etc., preforms for forming same and the like, are carried out by shaping the nitrile polymer by procedures known in the art. In this connection, conventional plasticators can be used utilizing a screw rotating within a plasticizing zone to masticate the polymer wherein the screw is either axially fixed or reciprocable, the latter occurring for example in an injection molding system. The forming operations include both a melting step wherein the nitrile polymer is converted from solid to melt form by physical working at temperatures in the range of from about 93° to about 274° C. and any subsequent shaping step performed on the melt. The melting and shaping steps may occur sequentially or substantially simultaneously. Examples of forming operations used to prepare polymeric packaging materials include pelletizing, extrusion, blow molding, injection molding, compression molding, mill rolling, vacuum forming, plug assist thermoforming from sheet material, combinations of the foregoing and the like.

More than one forming operation wherein the nitrile polymer is heated and shaped may be involved in certain instances. This occurs, for example, in the case of a polymer which is heated through working to a melted state, extruded and pelletized and then the pellets are heated again for melting and shaped into a tubular parison which is then shaped into a container such as a bottle. In such situations, the present invention contemplates having the myrcene in intimate contact with the nitrile resin during at least one of the forming operations wherein the polymer is heated to the point where it melts and is then shaped. Preferably when more than one heating step is involved, the myrcene compound is intimately admixed with the nitrile polymer before or during the first step wherein the polymer is heated to the point where it melts.

The actual measurement of the amount of RAN in products formed of nitrile polymers and of AN monomer extracted by an extracting liquid are not considered part of this invention. In this regard any method capable of detecting AN monomer to 10 ppb can be used to measure the amount of AN monomer in products of nitrile polymers. Such methods, which are known to those in the art, include colorometric, polarographic, gas chromatographic, fluorometric and electrochemical measurements. Methods for measuring RAN in nitrile polymers to 1 ppm and extractable AN monomer to 10 ppb in the extract are available to the public upon request from the U.S. Food and Drug Administration and are described in and a part of Food and Drug Administration Regulation No. 121.2629 which is referenced in The Federal Register, Vol. 40., No. 30.

Tests to determine the amount of extractable AN monomer in packaging materials prepared from nitrile polymers are run on 32 ounce beverage bottles. The extraction tests are run for 7 and 15 days at 49° C. As illustrated in Example 19, in many instances it is convenient to run An extraction tests on molded test samples such as tensile bars or other convenient shapes rather than on bottles or other packaging materials.

The extraction tests described in the Examples using a 3% acetic acid solution (an FDA food simulant for acid types foods) as the extracting liquid illustrates one of the more difficult packaging applications where there is a high probability of extracting AN. in other less difficult applications, such as for example, the packaging of dry rice, oranges, bananas, aspirin, etc., such rigorous tests for determination of extractable AN may not be necessary. Those skilled in the art on reading the present specification can readily select test samples and test conditions to suit their particular needs.

The present invention also contemplates the use of other additives and ingredients in the polymeric compositions which do not adversely affect the properties of the resulting molded products such as taste when such products are packaging materials intended for food contact use. Examples of these ingredients include thermal stabilizers, light stabilizers, dyes, pigments, plasticizers, fillers, antioxidants, lubricants, extrusion aids, etc.

The following examples are set forth in illustration of the invention and should not be construed as limitations thereof. All parts and percentages of resin and myrcene compound are by weight unless otherwise specified. Wherever convenient, residual acrylonitrile is abbreviated as RAN and unless otherwise specified 3% acetic acid solution is used as the extracting liquid. The amount of myrcene compound is based on the weight of the nitrile polymer. The ppb values for extracted AN refers to nanograms of AN per gram of extracting liquid. A dash in a Table means that particular product was not tested.

EXAMPLES 1 TO 4

A copolymer in bead form containing 68% polymerized AN and 32% polymerized styrene prepared by conventional aqueous polymerization methods was dry blended with various scavenging amounts of myrcene. Blending to insure intimate admixture of the polymer and myrcene was carried out by placing the quantities of each in a polyethylene bag and shaking vigorously for 2 minutes. The nitrile polymer blends were converted from solid to melt form by physically working the polymer in multiple pass extrusion with a conventional plasticator in the form of a one inch extruder having a 16:1 L/D ratio fitted with a rotary two stage screw operating at 70 r.p.m. Zone temperatures of the extruder were set to provide a melt stock temperature of approximately 254° C. After each pass, samples were analyzed for RAN content with the results of these tests tabulated in Table I below.

TABLE I
SUMMARY OF EXAMPLES 1 TO 4

| Ex. | Percent Myrcene | Polymer Beads | ppm RAN 1 Pass | 2 Passes | 3 Passes |
|---|---|---|---|---|---|
| 1 | 0.0 | 0.7 | 7.0 | 9.9 | 11.7 |
| 2 | 0.97 | 0.7 | 2.5 | 2.6 | 3.0 |
| 3 | 0.14 | 0.7 | 6.0 | 8.0 | 7.1 |
| 4 | 0.03 | 0.7 | 7.3 | — | 9.9 |

Control Example 1 illustrates that without myrcene the level of RAN in the polymer during melt processing increases ten to about sixteen fold, depending on the number of extrusion passes, vis-a-vis the initial RAN level in the polymer. Examples 2–4 illustrate that the use of small scavenging amounts of myrcene effectively suppresses and regulates the amount of RAN in the polymer at significantly lower levels than the control at very dilute concentrations of the additive and the AN in the polymer, and in the case of Example 2 maintains such RAN level at no greater than about 3 ppm.

EXAMPLES 5 TO 7

The following Examples b 5 to 7 illustrate a steeping method for obtaining an intimate admixture of myrcene and nitrile polymer. In the examples, a slurry of the nitrile polymer beads used in Examples 1 to 4 in water was heated to 140° C. and myrcene was then added. The mixture was stirred at 140° C. for 10 minutes and cooled. The steeped slurry was filtered and washed thoroughly with water and dried at 80° C. for at least 24 hours before extrusion processing in the same equipment and with the same process conditions used in Examples 1 to 4, except that melt temperature was somewhat higher at about 263° C. The results of these tests are tabulated in Table II below.

TABLE II
SUMMARY OF EXAMPLES 5 TO 7

| Ex. | Percent Myrcene Steeped | Steeped Resin Beads | ppm RAN 1 Pass | 2 Passes | 3 Passes |
|---|---|---|---|---|---|
| 5 | 0 | 24.2 | 27.0 | 23.5 | 23.7 |
| 6 | 2 | 10.8 | 10.7 | 9.4 | 8.8 |
| 7 | 4 | 4.4 | 2.7 | 2.9 | 2.5 |

The above results indicate that steeping myrcene into the polymer lowered the RAN in the resin from 24.2 to 4.4 ppm. Triple pass extrusion thereafter maintained the level at no greater than 2.9 ppm (Ex. 4).

EXAMPLES 8 TO 11

In commercial high rate extrusion processes for melting nitrile polymer-myrcene blends according to this invention, the blended composition can present extruder feed problems due to the lubricating effect of the additive. The following Examples 8 to 11 illustrate a preferred method of feeding an extruder with a nitrile polymer-myrcene mixture which involves adding a small amount of an antislip agent in the form of a coagulated and dried latex (rubber crumb) to the polymer-myrcene mixture prior to extrusion. The polymer composition and extrusion conditions were identical to those of Examples 5 to 7. In Example 9 the polymer beads-myrcene mixture was blended before extrusion in the same manner as for Examples 1 to 4. The results of these tests are tabulated in Table III below.

TABLE III
SUMMARY OF EXAMPLES 8 TO 11

| Ex. | Sample | % Additive | Mixing Procedure* | RAN In Starting Beads (ppm) | RAN (ppm) 1 Pass | 2 Passes | 3 Passes | Extruder Feeding |
|---|---|---|---|---|---|---|---|---|
| 8 | Control | 0 | — | <1 | 9.8 | 12.6 | 14.0 | Excellent |
| 9 | Control Plus Myrcene | 1.0 | 0 | <1 | 2.5 | 2.6 | 3.0 | Poor |
| 10 | Control Plus (i) Myrcene (ii) Rubber Crumb** | 1.0 11.1 | 1 | <1 | 4.6 | 5.3 | 6.3 | Excellent |
| 11 | Control Plus (i) Myrcene (ii) Rubber Crumb** | 1.0 11.1 | 2 | <1 | 3.2 | 1.7 | 4.8 | Excellent |

*0 The beads were weighed into a polyethylene bag followed by addition of myrcene with vigorous shaking for 5 minutes.
1 Myrcene was mixed with rubber crumb and this mixture added to the polymer beads.
2 Myrcene was mixed with the polymer beads and to this is added the rubber crumb.
**Rubber crumb is a rubber graft material of composition:
butadiene - 30-34%
styrene - 38-42%
acrylonitrile - 16-20%
methyl methacrylate - 8-10%
ethylene glycol dimethyl acrylate - 0.5-1.0%

A review of the above data illustrates that processibility problems as regards extruder feeding can be eliminated without reducing the RAN scavenging effect of myrcene by adding a small amount of rubber crumb to the beads-myrcene charge to the extruder.

EXAMPLES 12 TO 16

The following Examples 12 to 16 illustrate the present invention in providing shaped products with low RAN content which are intended for packaging environmentally sensitive substances. Nitrile polymer of the type used in Examples 1 to 4 is dry blended with various amounts of myrcene compound, mixed with the rubber crumb of the type used in Examples 10, 11 and then injection molded in a commercial size injection molding machine at temperatures in the range of from 230° to 270° C. into hollow, tubular preforms of circular cross section, closed at one end and having a molded finish at the other end. Such preforms are further described, in U.S. Pat. No. 3,900,120, col. 5, lines 13-42, the content of which is incorporated herein by reference. Except for the levels of rubber crumb noted, the polymer forming such preforms and bottles is free of rubber-containing impact modifiers with the walls thereof considered to contain the reaction product of (a.) an AN chemical scavenger, i.e., myrcene and (b.) AN monomer. After cooling to room temperature, preforms formed as just described were analyzed for RAN content while others formed in such manner were reheated to molecular orientation blowing temperature of about 132° to 138° C. and then distended in a conventional blow mold into 32 ounce (950 cc.) self-supporting bottles intended for packaging beverages and the like. The level of RAN in the bottles is then determined. Optical quality of the bottles is also visually noted. The results of these tests are tabulated in Table IV below. Processibility is determined from the standpoint of feeding the screw of the injection molding plasticator.

TABLE IV
SUMMARY OF EXAMPLES 12 to 16

| Ex. | Blended Additive | % Wt. | Process-ibility | RAN (ppm) Preform | RAN (ppm) Bottle | Bottle Optical Quality* |
|---|---|---|---|---|---|---|
| 12 | Control | — | Fair | 9.1 | 8.3 | A |
| 13 | Myrcene | 1 | Poor | — | 1.9 | A |
| 14 | Rubber Crumb Myrcene | 1 1 | Fair | 2.9 | 3.8 | A |
| 15 | Rubber Crumb Myrcene | 3 1 | Good | 3.7 | 3.6 | A |
| 16 | Rubber Crumb Myrcene | 5 1 | Excellent | 5.3 | 3.4 | A |

*A = Control; D = poor; B and C would be intermediate A and D.

The above data illustrates the efficiency of myrcene in reducing the amount of RAN in the walls of preforms and containers formed of nitrile resins according to the invention, in some cases to less than 3 ppm in such preforms and bottles. As indicated, the additional minimal heat history experienced by the preforms in reheating to bottle blowing temperatures did not significantly affect RAN level, and in examples employing myrcene bottle optical quality was equal to that of the control.

EXAMPLES 17, 18

The following Examples 17, 18 illustrate the efficiency of the myrcene AN scavenger of the invention in minimizing the amount of RAN extracted from shaped packaging materials in contact with environmentally sensitive substances.

Thirty-two ounce (950 cc.) beverage bottles molded in the manner described in Examples 12 to 16 are rinsed with water, filled with 32 ounces of acetic acid solution in water, capped and heated at 49° C. (120° F.) for 7 and 15 days. The bottles and contents are then cooled to room temperature and the amount of RAN in ppb extracted by the extracting liquid is determined. The results of these tests which are run in duplicate are tabulated in Table V below.

TABLE V
SUMMARY OF EXAMPLES 17 AND 18

| Ex. | % Myrcene | RAN In Bottle (ppm) | RAN Extracted (ppb) 7 days | RAN Extracted (ppb) 15 Days |
|---|---|---|---|---|
| 17 | None | 5.8 | 6.4 | 10.7 |
| 18 | 1 | 2.0 | 3.0 | 3.4 |

Control Example 17 illustrates that when no myrcene is added to the nitrile polymer the amount of RAN extracted is in the range of 6 to 11 ppb with the powerful 3% acetic acid extracting liquid over 7 to 15 day periods. Example 18 illustrates the use of a small amount of myrcene additive to cause a significant reduction in the amount of extractable RAN.

EXAMPLE 19

This Example 19 illustrates accelerated RAN extractability tests from molded test samples such as tensile bars or other convenient shapes rather than on bottles or other packaging materials.

A nitrile polymer in pellet form after triple pass extrusion in the manner described for Examples 1 to 4 and of the type used to prepare the bottles of Examples 12 to 16 is used to prepare dog-bone type molded tensile bars having a surface area of about 9.3 sq. in. according to ASTM D-638-68 (Type 1) by molding the nitrile polymer at about 218° C. and 1400 psi. The ratio of the surface area of the tensile bars (about 9.3 sq. in. or 60 sq. cm.) to the volume of extracting liquid used (70 cc.) aproximates the ratio of the surface area of the inside of a 32 ounce beverage bottle (about 100 sq. in. or 646 sq. cm.) which is in contact with the extracting liquid (32 oz. or 950 cc.). The ratio of surface area to volume of extracting liquid (sq. cm./cc.) is about 0.680 for the 32 ounce bottles and about 0.857 for the tensile bars.

The molded tensile bars are placed in a test tube (25×300 mm). Seventy cubic centimeters (cc.) of a 3% acetic acid solution (30 gms. glacial acetic acid in 970 gms. of distilled water) are charged to the test tube containing the tensile bars. The test tube is then sealed with a rubber seal lined with Reynolds Reynolon and the tube is placed in an oven at 71° C. (160° F.) for 48 hours. The test tube is then cooled to room temperature and the amount of RAN extracted into the solution is determined. The test results are summarized below.

| | SAMPLES A | SAMPLES B |
|---|---|---|
| % Myrcene | None | 1.0 |
| RAN in the sample (ppm) | 11.7 | 3.0 |
| Extracted RAN (ppb) | 80.4 | 8.1 |

The preceding data further illustrates the efficiency of myrcene in reducing the amount of extractable RAN in the tensile bar test samples.

TASTE TESTS

In order to determine whether myrcene or any reaction product of myrcene with AN would extract from the surfaces of packaging materials for containing environmentally sensitive substances to the extent the taste properties of the packaging materials would be affected, taste tests are conducted using 32 ounce bottles formed from polymer and according to the forming operation described for Examples 13 to 16. The bottles are filled with 10 ounces of a well known commercially available cola beverage (Coca-Cola ®) and placed in an oven for 7 days at 30° C. (100° F.) along with the same beverage in a glass bottle. At the end of this period, the contents of the plastic bottles are poured into each of 8 unmarked vessels and the contents of the glass bottles are poured into each of 16 unmarked vessels. Four persons previously trained in taste-test techniques and sensitive to detecting taste due to extracted materials from polymers are chosen to act as the taste panel. Each member of the panel is given two of the vessels containing the cola beverage from the glass bottle and one vessel containing the cola beverage from the plastic bottle. The tasters do not know which of the three vessels contain the beverage from the plastic bottle and are asked to determine whether one of the three samples has a taste different from that of the other two, and, if so, to designate which one. This is known as a "triangle taste test". The test is then repeated to determine reproducibility. If a panel detects a taste difference due to myrcene in the beverage packaged in a plastic bottle, the plastic bottle is deemed to fail the taste test. In both instances the tasters detected no difference in the taste of the contents of the plastic bottles from that of the contents of the glass bottles thereby showing that the presence of myrcene does not affect the taste properties of the nitrile packaging materials. The presence of extracted RAN in a cola beverage repeatedly tested by a panel as described herein cannot be detected by taste even with control plastic bottles without myrcene compound.

To the best of applicant's knowledge, substitution of other forms of shaped packaging materials for the bottles of Examples 17, 18 such as film or sheet material useful as over-wrappings, tubs or cup-like containers useful in holding margarine, butter and similar-based food products as well as trays for holding meats, should give similar results to those of Example 18 in terms of a low level of extractable RAN at comparable levels of RAN in the shaped packaging materials and of polymerized AN in the copolymer nitrile resin. As polymerized AN level in the polymer decreases from that of Examples 17, 18 RAN extraction level will increase for comparable free AN monomer levels in the polymer.

Similarly, substitution of nitrile polymers containing levels of polymerized AN down to about 10% and specifically to about 20%, the latter being known as styrene/acrylonitrile (SAN) resins, as well as copolymers of styrene and acrylonitrile containing an elastomer which are known as ABS resins, for those of the foregoing examples should give comparable low level regulation of RAN in the melted resin and shaped products at comparable starting levels of free AN in the initial raw material polymer.

The preceding description is set forth for purposes of illustration only and is not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. In the process of melting acrylonitrile copolymer by physical working while generating free acrylonitrile monomer in the melt, the improvement which comprises having a scavenging amount of myrcene in admixture with the copolymer during said melting to minimize the level of free acrylonitrile monomer in the copolymer.

2. The process of claim 1 wherein the copolymer comprises at least about 50 weight percent polymerized acrylonitrile.

3. The process of claim 1 wherein said physical working is accomplished by masticating the copolymer in a plasticizing zone.

4. The process of claim 1 wherein the acrylonitrile copolymer and myrcene are dry blended together before said physical working.

5. The process of claim 1 wherein the amount of myrcene is in the range of from about 0.005 to about 4% based on the weight of the acrylonitrile copolymer.

6. The process of claim 1 wherein the acrylonitrile copolymer is steeped in myrcene before said physical working.

7. The process of claim 1 wherein the level of free acrylonitrile monomer in the copolymer during said melting is no greater than about 3 ppm based on the weight of the copolymer.

8. The process of claims 1, 2, 3, 4 or 5 wherein the acrylonitrile copolymer contains styrene as a copolymerized monomer.

9. The process of claim 3 wherein the copolymer is masticated in a plasticizing zone comprising a screw rotating within a barrel.

10. The process of claim 9 wherein the screw axially reciprocates.

11. A method for reducing the extractable content of acrylonitrile monomer from shaped packaging materials formed of an acrylonitrile copolymer which comprises having a scavenging concentration of myrcene in intimate contact with the polymer during at least one forming operation in which the polymer is heated to form a melt and shaped so that a packaging material is obtained with an extractable acrylonitrile monomer content of less than about 10 ppb.

12. The method of claim 11 wherein the forming operation includes an extrusion operation.

13. The method of claim 11 wherein the forming operation includes an injection molding operation.

14. The method of claim 11 wherein the forming operation includes a blow molding operation.

15. The method of claim 11 wherein the polymer comprises at least 50 weight percent polymerized acrylonitrile.

16. The method of claim 12 further comprising a blow molding operation.

17. The method of claim 13 further comprising a blow molding operation.

18. In the process for preparing shaped packaging materials from acrylonitrile copolymers, which process involves at least one forming operation comprising heating the polymer to form a melt and shaping the polymer, the improvement which comprises having myrcene in intimate contact with the acrylonitrile copolymer during at least one forming operation, said myrcene being employed in an amount sufficient to reduce the extractable free acrylonitrile monomer content of the resulting packaging material.

19. The process of claim 18 wherein the acrylonitrile polymer comprises from about 55 to about 85 weight percent polymerized acrylonitrile.

20. The process of claim 19 wherein the level of extractable free acrylonitrile monomer in the resulting packaging material is less than about 5 ppb.

21. A preform for conversion into a container for environmentally sensitive materials, said preform being formed of a thermoplastic material comprising at least about 10 weight percent of polymerized acrylonitrile monomer to which a scavenging amount of myrcene has been added, the level of free acrylonitrile monomer in such preform being no greater than about 3 ppm based on the total weight of the polymer.

22. The preform of claim 21 wherein the thermoplastic material comprises from about 50 to about 85 weight percent polymerized acrylonitrile.

23. The preform of claim 21 in tubular shape.

24. The preform of claim 21 wherein the thermoplastic material is substantially free of rubber-containing impact modifiers.

25. The preform of claim 22 wherein the thermoplastic material contains the reaction product of (i) myrcene and (ii) acrylonitrile monomer.

26. A shaped packaging material for environmentally sensitive products formed of a thermoplastic polymer comprising at least about 10 weight percent of polymerized acrylonitrile monomer to which a scavenging amount of myrcene has been added, the level of free acrylonitrile monomer in said packaging material being no greater than about 7 ppm based on the total weight of the polymer.

27. The packaging material of claim 26 wherein the extractable acrylonitrile monomer is no greater than about 10 ppb.

28. The packaging material of claim 26 wherein the thermoplastic resin comprises from about 50 to about 85 weight percent acrylonitrile.

29. The packaging material of claim 26 wherein the thermoplastic resin is substantially free of rubber-containing impact modifiers.

30. The packaging material of claim 26 wherein the thermoplastic resin contains the reaction product of myrcene and acrylonitrile monomer.

31. The packaging material of claim 26 in the form of a film.

32. The packaging material of claim 26 including an environmentally sensitive substance packaged therein.

33. The packaging material of claims 26, 27, 28, 31, or 30 in the form of a self-supporting container.

34. The packaging material of claim 32 wherein the level of acrylonitrile monomer in the contents is less than about 5 ppb after 7 days at 49° C.

35. Containers formed by the method of claim 11.

36. Films formed by the method of claim 11.

37. Bottles formed by the method of claim 11.

38. Self-supporting containers formed by the process of claim 18.

39. Films formed by the process of claim 18.

40. Bottles formed by the process of claim 18.

41. Environmentally sensitive substances packaged in the packaging materials of claims 35, 36 or 37.

42. Environmentally sensitive substances packaged in the packaging materials of claims 38, 39 or 40.

* * * * *